United States Patent [19]
Duncan, Jr.

[11] Patent Number: 5,259,029
[45] Date of Patent: * Nov. 2, 1993

[54] DECODING DEVICE FOR COMPUTER SOFTWARE PROTECTION

[76] Inventor: F. Jeff Duncan, Jr., 208 Partridge Way, Kennett Square, Pa. 19348

[*] Notice: The portion of the term of this patent subsequent to Jan. 24, 2009 has been disclaimed.

[21] Appl. No.: 523,875

[22] Filed: May 16, 1990

[51] Int. Cl.$^5$ .............................................. H04L 9/32
[52] U.S. Cl. .................................... 380/4; 380/23; 380/25; 340/825.31; 340/825.34; 235/380
[58] Field of Search ............... 340/825.31, 825.34; 235/380, 382

[56] References Cited
U.S. PATENT DOCUMENTS

| | | | |
|---|---|---|---|
| 4,450,535 | 5/1984 | de Pommery et al. | 364/900 |
| 4,679,236 | 7/1987 | Davies | 380/23 |
| 4,779,224 | 10/1988 | Moseley et al. | 364/900 |

Primary Examiner—Bernarr E. Gregory
Attorney, Agent, or Firm—Watov & Kipnes

[57] ABSTRACT

Upon execution of the protected software, a random number is generated by the software and displayed to the user. The user inputs this number into a conversion device. This device utilizes a algorithm to obtain a unique output value. The user enters this response value into the software program. A code segment in the software compares the random number originally generated with the response value and determines if the proper algorithm has been applied. If the algorithm is verified the protected portion of the program is initiated. If the algorithm is not verified the software provides the user with a menu of one or more options but does not grant access to the protected portion of the program. Options would include 1) The use of a pay-per-call phone service to provide the unique output valued provided by the algorithm, 2) A toll free number by which a conversion device can be purchased, 3) Limited access to a demonstration version of the protected portion of the program.

7 Claims, 4 Drawing Sheets

DECODING DEVICE FOR COMPUTER SOFTWARE PROTECTION

BACKGROUND 128 1. Field of the Invention

This invention relates to a protection scheme that limits computer software access to authorized individuals.

2. Description of Prior Art

The concept of CodeCuffs TM originated from the need in the software industry to discourage illegal duplication and subsequent distribution of copyrighted computer programs. Estimates from the Software Publisher's Association indicate that, conservatively, three billion dollars are lost annually to illegal copying of software.

Various attempts have been made to protect the code itself by utilizing non-standard disk and data formats in order to avoid copying of the disks. Other attempts include the use of printed material containing entry codes necessary to run the program. In some cases this material is designed to be difficult to photocopy (using various color schemes and subtle differences) to avoid illegal duplication. Another method involves the use of a hardware device that is connected to the computer and has a distinctive identification which can be read and verified by the software. Still others have external devices that are time dependent and must be read by or otherwise communicated to the computer to verify that the user is in possession of the device prior to affording access.

Each of these methods has its shortcomings. The disk protection schemes can be circumvented by software designed to copy non-standard formats, while authorized users must cope with the inability to make backup copies and difficulty in loading the applications on hard disks in their computer. Devices that are physically connected to the computers are cumbersome to use, require manual modifications to the computer I/O devices and are difficult to move from one CPU to another. The external devices have relied on time dependent functions, or optical coupling to guarantee the device's presence prior to granting access to the software. These methods have not gained acceptance, likely due to their complexity, cost and inconvenience.

The literature schemes, though difficult to photocopy, can normally be overcome through persistence or the use of the emerging availability color copying technology. There is also a recognized void in the ability of any existing systems to limit access to individuals in a multiuser environment.

3. Unmet Opportunity in the Industry:

- The fundamental needs of the industry in the area of copy protection are summarized below.

Limit the number of fully operational copies of a program to the number that has been legally purchased.

Allow backup copies of all distribution diskettes to be freely made.

Eliminate special procedures associated with hard disks involved in the installation, removal, backup and recovery procedures.

Minimize expense to software vendors to accomplish software protection.

Allow immediate remote support of any software protection customer service needs without compromising the security system.

Minimize user inconvenience associated with the protection schemes.

Prior to the development of CodeCuffs TM, no viable solution had been identified to meet all of these criteria.

SUMMARY OF THE INVENTION

CodeCuffs TM utilizes an independent converting device (decoder) capable of receiving user input and returning a unique output. The device is not time dependent as utilized in the concepts of U.S. Pat. Nos. #4,599,489 and #4,609,777 and does not require physical connection to the computer. The device provides a "Decode function by which a software-generated value is input and a second unique value is output based on a predetermined algorithm. The algorithm is unique to the software being protected, and differs from one software package to another or within different production lots of the same software. The software being protected generates a random number (or alphanumeric sequence) that the user enters into the decoder. The result generated by the decoder is then entered into the computer. A code segment included in the software then checks to verify that the appropriate decoding had been performed and if so the program is allowed to run. Assuming a six digit numeric, this results in a one in one million opportunity for the software to be accessed without the proper decoding. Alphanumerics or more digits could increase these odds.

This concept permits standard backup copying and hard disk installation and allows additional copies to be made while controlling access through the decoding tool distributed with purchase. Duplication of the decoder would require extreme sophistication, and while not likely, could be remedied through patent infringement litigation.

In another embodiment of the scheme, the software can be sold initially and the decoding tool sold separately. This approach permits unlimited copying and distribution of the complete software packages while controlling the accessibility to the full capabilities of the software. If the decode function is not satisfied, the program can be configured to run in a demonstration mode (limited functional capability) and to provide promotional information to encourage subsequent purchase of the decoding device. This allows evaluation of programs while eliminating the need for separate demonstration versions. This ease of duplication and distribution will enable increased exposure while allowing the author of the software to be compensated separately for demonstration and full use versions of the software.

The decoder appearance could be customized to the software vendor's specifications.

Remote support of users who experience problems or lose the device can be easily provided by remotely decoding individual sessions for them until a replacement decoder can be obtained. Replacement policies would be at the discretion of the software vendors.

This remote decoding capability can also be a revenue generator through providing a pay-per-use service potentially utilizing toll telephone technology such as the 1-900 system or other schemes to charge the user for each decode provided.

Object code would be provided to the software vendors for inclusion in their applications to assure maximum security of the algorithm schemes.

The CodeCuffs TM concept, while developed in response to the PC software industry, has potential applications in many areas where controlled access is desired. Another embodiment of the concept exists by which a multiple algorithm converter would have active and inactive algorithms. These algorithms could be remotely activated by using the same decoding security wherein the device itself would generate a random number and require the proper response which could be provided remotely, i.e. over the phone. This security concept can have applications in such diverse areas as limited access facilities, 24 hour banking machines, vending machines, telephone credit calls, access to secure computing environments. Initial applications will be pursued in the software industry.

BRIEF DESCRIPTION OF THE DRAWINGS

Various embodiments of the present invention are described below with reference to the drawings, in which like items are indicated by the same reference designation, wherein.

DETAILED DESCRIPTION OF THE PREFERRED EMBODIMENTS

Process Description

One embodiment of the concept described is a credit-card-calculator-type device, capable of a numeric conversion.

The decoder accepts input from a twelve key input pad 10 consisting of digits 0-9, a cancel key "C" and a convert key designated "Decode". Display is a minimum six digit numeric LCD. Power is preferably solar optionally replaceable battery.

Functionality includes the following sequential operations:

1) The input of a six digit value.
2) The conversion of that value to a second value through an algorithm consisting of algebraic functions and factory programmable constants. The algorithm would assure a result of a six digit or smaller conversion result. In mass production the four factory programmable constants are varied every 1,000 to 10,000 units.
3) Display of the conversion result, as a six or less digit integer.

The clear key is active at any point in the process; during entry and after conversion. Display returns to 0 value after clear and on power up.

-The decoder uses a film type keypad 10 (membrane touch switch), with the capability of providing a customized graphic on the keyboard.

Converter Description

Figure 1:
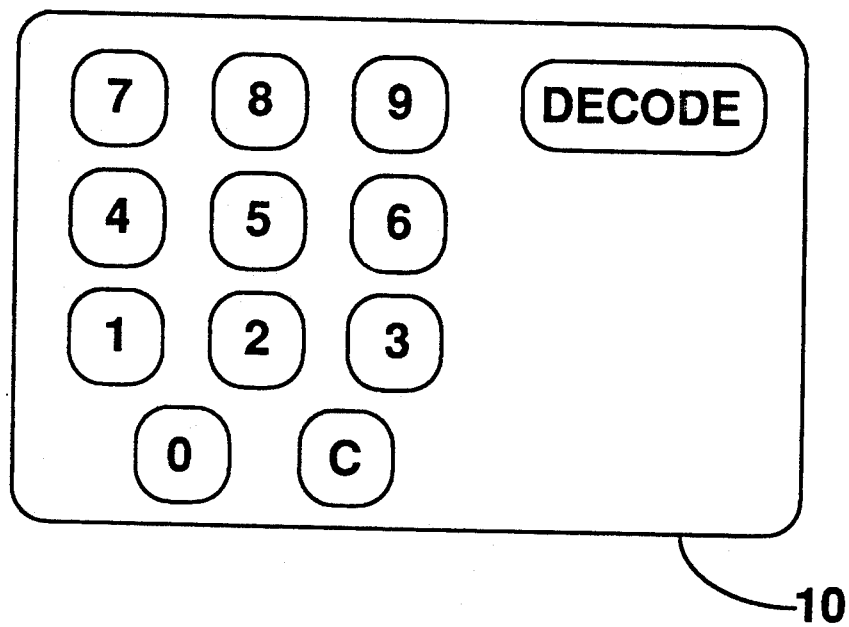
FIG. 1 represents a preferred embodiment of an uncoupled decoding device similar in construction to a handheld credit card calculator.
Figure 2:
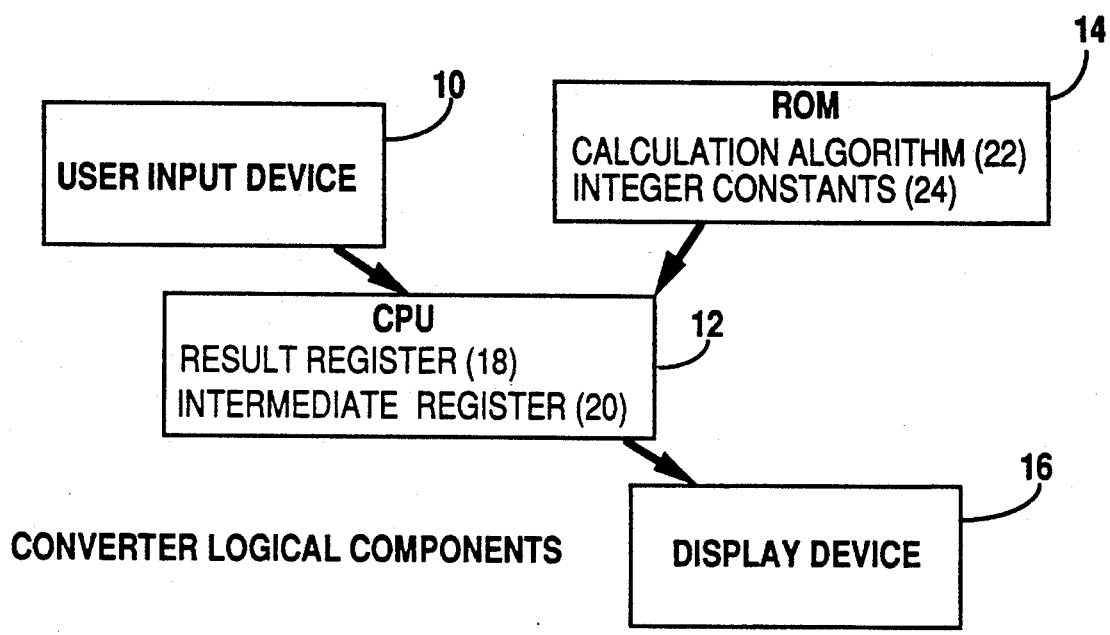
FIG. 2 shows the logical flow of the process performed by the decoding device.

In the preferred embodiment, the decoder device would physically resemble a credit-card calculator. A rendering of the device is shown in FIG. 1. The process of the decoder is described below and is graphically referenced in FIG. 2 which represents the decoder consists of four major functional components:

The User Input Device 10: a keyboard with numeric or alpha numeric keys, a clear key and a convert key, in this example.

The CPU 12: capable of performing mathematical calculations and storing volatile results.

ROM 14: a read only memory segment capable of storing and providing factory determined constants and the algorithm instructions.

A Display Device 16: an LCD or similar user interface to display the values input and output.

The following process is supported through the functional components:

At any time a keyboard entry 10 indicating the Clear key "C" has been activated results in the CPU Result register 18 being reset to a zero value, and the Display Device 16 is refreshed to reflect the zero value of the result register.

After a previous Clear or Decode sequence, the following entry sequence is available:

At any time a keyboard entry 10 is detected indicating a digit key (0, 1, 2 . . . 9) has been activated, the value of the digit is placed in an intermediate CPU register 20. The display 16 will be refreshed to reflect the values of that register 20. The next five subsequent numeric keyboard entries would increment the intermediate register 20 in the digit position and roll the existing entry by ten times. After each such entry the display 16 would be refreshed to reflect the value of the intermediate register 20. Any subsequent numeric keyboard entry after the fifth would be ignored.

The decode would be activated when a keyboard entry 10 is detected indicating that the convert key "Decode" had been activated. If the intermediate register 20 is equal to zero at this point a result of zero would be entered in the CPU result Register 18 and refreshed on the display 16. Otherwise a predetermined algorithm is stored in ROM 14 for both algebraically manipulating data, and performing digit manipulations including truncating digits, and rolling first to last digits in an integer. Factory set constants are stored in ROM 14. The algorithm 22 and constants 24 are applied to the intermediate register 20, and the results are placed in the results register 18 and refreshed to the display 16.

Software Module Description

A segment of code positioned early in the program sequence would present a randomly generated value, potentially seeded by the system clock. The system would then wait for a decoded response from the user and compare the response to the required response based on the algorithm that is common to the decoder and the software segment. If the response is valid, the program would be allowed to run. If the response is invalid the program could run in a demonstration mode, provide another number to decode, provide a 800 or 900 phone number for assistance, ordering, or any number of other options.

Figure 3:
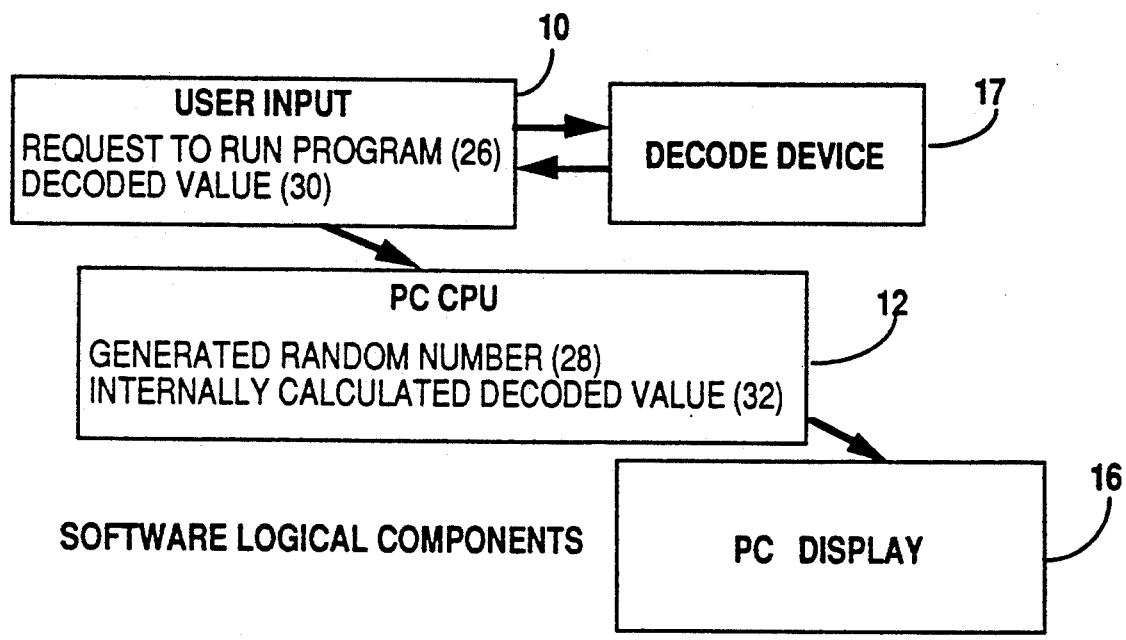
FIG. 3 shows the logical flow of the user and software interface.

Another embodiment of the concept would be that of the application software including a code segment providing the following functions. (Reference FIG. 3.)

Upon user request 26 for execution of the application, a code segment, provided to the software vendor in object code, would generate a six digit pseudo-random integer 28 utilizing the system clock as a generation seed. This integer would then be displayed on the user screen or display 16 along with an appropriate software specific graphic and instructions for the user to enter the appropriate decode value. After the user has obtained the decoded value from the external decoding device 17 the code segment will accept user input of the decoded value 30. The code segment would then internally decode the random number previously generated (using the algorithm and constants identical to those in the decode device and unique to the program being protected) and produce an internally generated decoded value 32. A comparison would then be made between the user provided decoded value 30 and the internally generated decoded value 32. If the comparison is positive, the application would be executed, otherwise only a demo version of the application would be executed, and information on purchase of the full version would be made available to the user.

EXAMPLE

Figure 4:
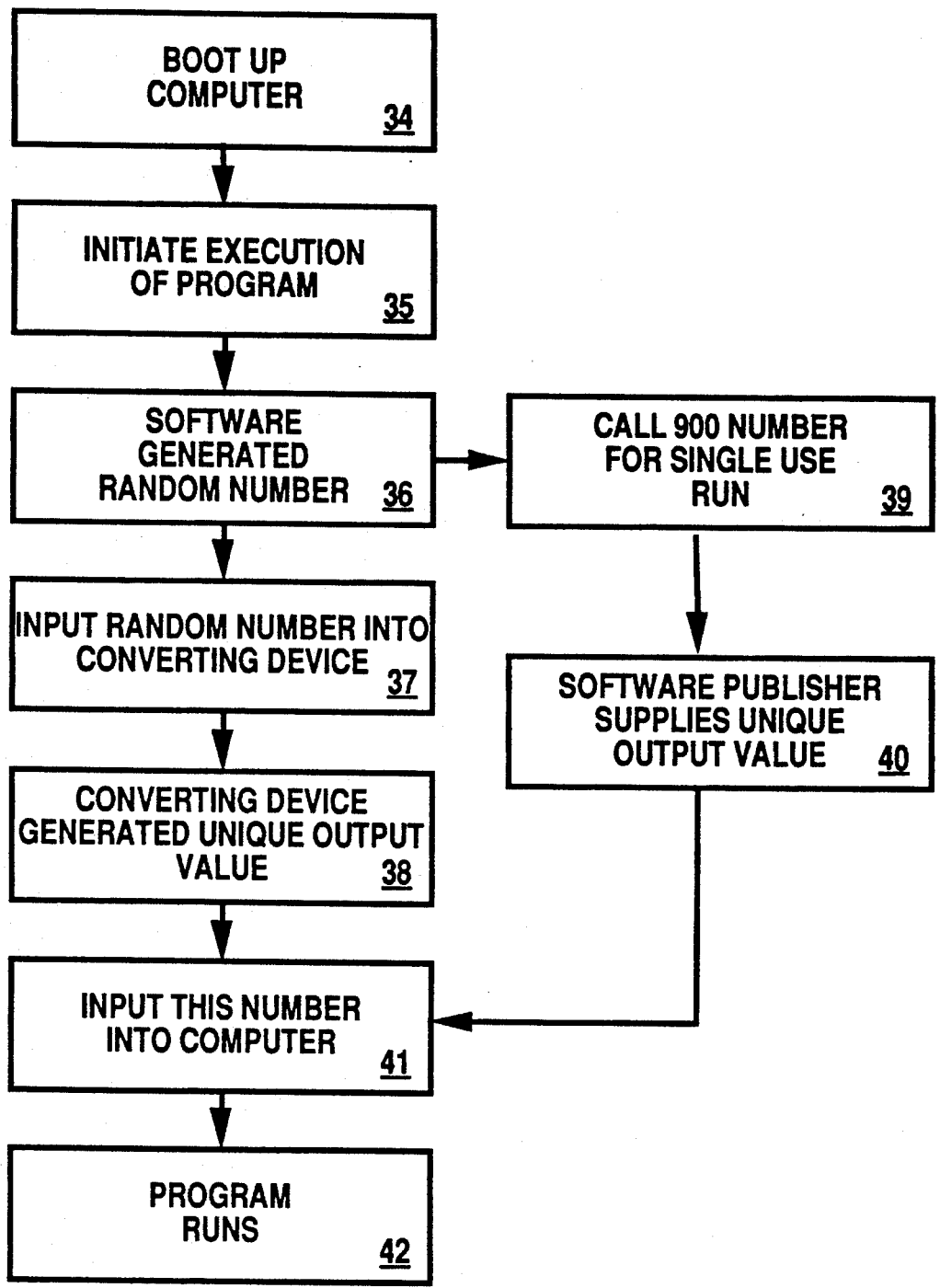
FIG. 4 represents a flow chart of the entire sequence of the protection scheme.

A typical user sequence is depicted in FIG. 4. The user would boot-up the computer 34, insert the program diskette in the drive or reference the program on a hard drive, and initiate execution of the program 35. The first screen would reveal a menu, offering the option of watching the software in demonstration mode, or proceeding with the full application. If the application is chosen, the next screen would provide a six digit pseudo-random integer and request entry of the decoded solution 36. If the user does not have a decoder he can call a toll telephone number (1-900) provided for the proper decoded solution 39 to receive from the software publisher the unique output value necessary to start that session 40. The user would then input this value into the computer 41 which would satisfy the security screen and allow use for one full application 42.

This ability to use and provide 1-900 (or other pay-per-use) number access allows making unlimited copies of the software while enabling the author to be compensated when the application is utilized by individuals who are not registered users and not in possession of a decoder.

Once the user has elected to purchase the decoder the sequence will be as follows.

User would boot-up the computer 34, and initiate the program 35. The menu screen would offer either a demonstration or full application. When the application is chosen, the next screen would provide a six digit pseudo-random integer and request the decoded value 36. The user would input the integer into the decoder and press the convert button in step 37. The decoder would provide the unique output value 38. The user will then input this value into the computer or CPU 12 in step 41 which will satisfy the security screen and allow one full application use 42.

I claim:

1. A method of PC software protection comprising the steps of:

upon initial execution of the PC software program displaying upon a screen a pseudo-random integer and a request for entry of a decoded solution of said integer;

user enters the pseudo-random integer into a conversion device;

conversion device performs a unique digits manipulating algorithm that generates said decoded solution;

user enters this unique output value into the PC software;

said software determines if the proper digits manipulating algorithm has been utilized;

if the algorithm corresponding to the software protected has been utilized, said software allows full access to the functionality of the software being protected; and if the algorithm corresponding to the software protected has not been utilized, said software provides user with ordering information necessary to obtain the appropriate decoding device.

2. The PC software protection method of claim 1, wherein said step of providing user with ordering information necessary to obtain the appropriate decoding device comprises the step of providing access to a demonstration version of the PC software functionality being protected.

3. The PC software protection method of claim 2, wherein said initial execution step comprises the step of at intervals during the PC software execution revealing on a screen a pseudo-random integer, and a request for entry of the decoded solution.

4. The PC software protection method of claim 1, wherein said initial execution step comprises the step of at intervals during the PC software execution revealing on a screen a pseudo-random integer, and a request for entry of the decoded solution.

5. The PC software protection method of claim 1, further including the step of providing a user with an access code, for accessing said software protection method remotely via a telephone.

6. The PC software protection method of claim 5, wherein said initial execution step comprises the step of at intervals during the PC software execution revealing on a screen a pseudo-random integer, and a request for entry of the decoded solution.

7. A portable decoding device for providing a unique integral response to an integral input comprising:

means for input and display of a user entered integer value;

means for storing a combination of algebraic and digit manipulations in a read only memory;

means for utilizing said combination of algebraic and digit manipulations on the input value resulting in a unique output value; and means for display of said output to the user.

* * * * *